United States Patent
Howe et al.

(10) Patent No.: US 8,557,119 B1
(45) Date of Patent: Oct. 15, 2013

(54) HIGH WATER RECOVERY FROM DESALINATION SYSTEMS USING ION EXCHANGE TECHNOLOGY

(75) Inventors: Kerry Howe, Albuquerque, NM (US); Joshua Goldman, Albuquerque, NM (US); Bruce Thomson, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 417 days.

(21) Appl. No.: 12/880,359

(22) Filed: Sep. 13, 2010

Related U.S. Application Data

(60) Provisional application No. 61/276,378, filed on Sep. 11, 2009.

(51) Int. Cl.
*B01D 61/58* (2006.01)
*B01D 61/02* (2006.01)
*B01D 15/04* (2006.01)
*B01D 59/30* (2006.01)

(52) U.S. Cl.
USPC .......... 210/634; 210/638; 210/652; 210/660; 210/669; 210/670; 210/677; 210/681

(58) Field of Classification Search
None
See application file for complete search history.

(56) References Cited

U.S. PATENT DOCUMENTS

| | | | |
|---|---|---|---|
| 3,350,292 A * | 10/1967 | Weinberger et al. | 210/651 |
| 3,639,231 A * | 2/1972 | Bresler | 210/638 |
| 4,161,446 A * | 7/1979 | Coillet | 210/638 |
| 6,113,797 A | 9/2000 | Al Samadi | |
| 6,461,514 B1 | 10/2002 | Al-Samadi | |
| 7,981,295 B2 * | 7/2011 | Al-Samadi | 210/652 |
| 2008/0277344 A1 | 11/2008 | SenGupta et al. | |

OTHER PUBLICATIONS

Boodoo et al, "Ion Exchange Synergy with Other Water Treatment Technologies—The Way of the Future" Apr. 12, 2010 Australian Power Institute Conference.
Boodoo et al, "Ion Exchange Synergy with other Water Treatment Technologies—The Way of the Future" (Power point presentation) May 19, 2010, 2010 Australian Power Institute Conference.
Purolite Product Bulletin Aug. 16, 2010.
Tokmachev et al, "Investigation of Cyclic Self-Sustaining Ion Exchange Process for Softening Water Solutions on the Basis of Mathematical Modeling" May 23, 2008 Reactive and Functional Polymers 68 (2008) 1245-1252.

* cited by examiner

*Primary Examiner* — Krishnan S Menon
(74) *Attorney, Agent, or Firm* — Gonzales Patent Services; Ellen M. Gonzales

(57) ABSTRACT

A novel method for improving water recovery from desalination systems by the removal of cations and/or anions using ion exchange (IX) technology. The system described herein is particularly useful for water recovery in brackish ecosystems and is unique in that important features include recycling, regeneration, and recovery of key components, thereby reducing costs and waste products.

18 Claims, 3 Drawing Sheets

HIGH WATER RECOVERY FROM DESALINATION SYSTEMS USING ION EXCHANGE TECHNOLOGY

CROSS-REFERENCE TO RELATED APPLICATIONS

The following application claims benefit of U.S. Provisional Application No. 61/276,378, filed Sep. 11, 2009, which is hereby incorporated by reference in its entirety.

BACKGROUND

Water availability and scarcity are critical issues in many parts of the world. The growth of desalination technologies in recent years has made it possible to convert brackish water and seawater into potable water at competitive prices, offering the promise of alleviating some water scarcity issues. Unfortunately, desalination of brackish water is constrained by solution chemistry. Many natural brackish water sources that could be used as a water supply in water-scarce regions are chemically different from seawater. While sodium and chloride are the predominant cation and anion, respectively, in seawater, the major cations in many brackish waters are calcium or magnesium and the major anions are sulfate or bicarbonate. Calcium and magnesium salts of sulfate and carbonate are considerably less soluble than sodium chloride. As water is extracted via desalination, these cations and anions are concentrated until solubility limitations are reached, at which point precipitation occurs. The onset of precipitation has negative consequences for desalination systems primarily because precipitation happens on surfaces. In membrane-based desalination systems such as reverse osmosis (RO), scale formation on membrane surfaces rapidly degrades system performance by restricting the flow of water and ultimately damages the membranes. In thermally-driven desalination systems, scale formation rapidly degrades system performance by reducing heat transfer efficiency and clogging system components such as valves, pipes and heat exchangers.

For brackish water treatment, measures to prevent scale formation can be a dominating constraint in overall desalination system design. Desalination systems nearly always include subsystems for pH adjustment and antiscalant addition to minimize scale formation. The biggest constraint, however, is that overall water recovery by the process must be limited to levels that will minimize scale formation. As potable water is recovered, the cations and anions are concentrated in the concentrate stream, so a high degree of water recovery is accompanied by high concentrations of cations and anions and therefore high potential for scale formation. Furthermore, even when proper design and operating procedures are used, variations in source water quality or other changes in operation may result in scale formation and the consequent loss of system performance, damage to membranes, and clogging of system components. Thus, design must be conservative. For brackish water treatment, net potable water recovery of 70 to 85 percent of the feed water is common.

Limitations imposed on water recovery by solubility considerations have two direct negative consequences on brackish water desalination. First, desalination is practiced because of scarcity of fresh water, and in inland areas brackish water may also be scarce. Thus, desalination in water-scarce areas is accompanied by a need to recover as much water as possible. Low recovery is simply a loss (or poor utilization) of available resources. Second, the fraction of source water not recovered for beneficial use becomes a waste stream that contains the concentrated cations and anions. Disposal of this waste stream is expensive and problematic because of the potential for environmental contamination. The larger the waste stream, the larger the costs associated with waste management. In some desalination systems, waste management is the largest component of overall system costs.

Clearly, then, technology to prevent scale formation would allow greater water recovery, increased utilization of available water resources and decreased waste production. According to various embodiments, the invention described herein is intended to do exactly that.

DETAILED DESCRIPTION

According to an embodiment the present disclosure provides a novel method for improving water recovery from desalination systems by the removal of cations and/or anions using ion exchange (IX) technology. The system described herein is particularly useful for water recovery in brackish ecosystems and is unique in that important features include recycling and regeneration of key components, thereby reducing costs and waste products.

Figure 1:
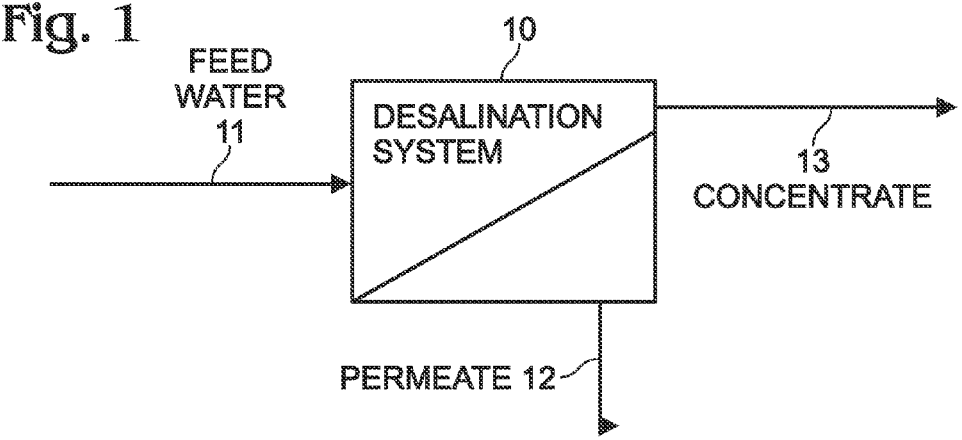
FIG. 1 is a schematic illustration of a conventional reverse osmosis (RO) desalination system.

Turning to FIG. 1, a conventional reverse osmosis (RO) desalination system 10 is shown. The feed water 11, is separated by the desalination system 10 into two streams: a permeate stream 12, and a concentrate stream 13. In this system, the concentrate stream 13 contains the system waste which then must be disposed of, a process which is often expensive and which may have significant environmental impact. Table 1, for example shows the concentration of various cations in the feed water, permeate and concentrate streams based on a hypothetical 1,000 m³/day system operating at 75 percent recovery with 99 percent total ion rejection, where recovery and rejection are calculated from the following formulas:

$$r = \frac{Q_p}{Q_F}$$

$$R = 1 - \frac{C_p}{C_F}$$

where:
r=recovery
R=rejection
$Q_p$, $Q_F$=flow rate of permeate and feed water, respectively
$C_p$, $C_F$=concentration in permeate and feed water, respectively

TABLE 1

Sodium, Calcium, and Magnesium Concentrations in RO-only Desalination Flow

| | | | Sodium | | Calcium | | Magnesium | |
|---|---|---|---|---|---|---|---|---|
| Flow | Description | Water Flow ($m^3/d$) | Conc. (meq/L) | Mass Flow (kg/d) | Conc. (meq/L) | Mass Flow (kg/d) | Conc. (meq/L) | Mass Flow (kg/d) |
| 11 | System feed | 1000 | 9.2 | 212.0 | 16.8 | 337.0 | 7.2 | 87.7 |
| 12 | System product | 750 | 0.09 | 1.59 | 0.17 | 2.53 | 0.07 | 0.66 |
| 13 | System waste | 250 | 36.6 | 210.4 | 66.8 | 334.5 | 28.7 | 87.0 |

The water quality in Table 1 is based on data from a brackish well in Maricopa County, Ariz., which was available in the United States Geological Survey (USGS) National Water Quality Assessment Program database. The brackish water has a total dissolved solids TDS concentration of 2,100 mg/L, representing a common situation where brackish water desalination could be used. Table 1 shows that 25 percent of the feed water ends up in the waste stream. The concentrations of ions in the waste stream are higher than the feed water because of the concentrating effect of the desalination system. Anions would be decreased in the permeate stream and concentrated in the concentrate stream in the same fashion as the cations in Table 1. The net result is a high-volume waste stream with nearly the entire mass of salts from the feed water.

According to an embodiment, the current invention uses ion exchange as an intermediate step in a desalination process train. Ion exchange is a process to remove undesirable ionic constituents by exchanging them with other ionic constituents. It has been used in water treatment for several decades. A common example of ion exchange is residential water softeners, in which the divalent cations calcium and magnesium are exchanged for the monovalent cations sodium or potassium. Other uses include demineralization of water for laboratory or industrial use, and removal of arsenic, nitrate, and perchlorate for municipal water supply. Ion exchange media is a resin that contains charged functional groups that attract oppositely charged "counter-ions." Ion exchange occurs when counter-ions are exchanged for similarly-charged ions in solution. Exchange is made on an equivalence basis; the resin and the aqueous solution must both maintain electroneutrality.

The ion exchange process is dependent on the selectivity of the resin for particular ions and the concentration of the various ions in solution. The selectivity of an ion exchange resin for a particular ion is controlled by the chemical properties of the ion such as the valence, atomic weight, ionic radius, and hydrated radius, and the physical properties of the resin such as the type of functional groups on the resin and the pore size distribution. When exchange capacity has been reached, an ion exchange resin can be "regenerated" by immersion in a highly-concentrated acid, base, or salt solution. The ability of resins to exchange one ion for another is well understood, and selectively coefficients are available in the literature or from resin manufacturers.

Figure 2:
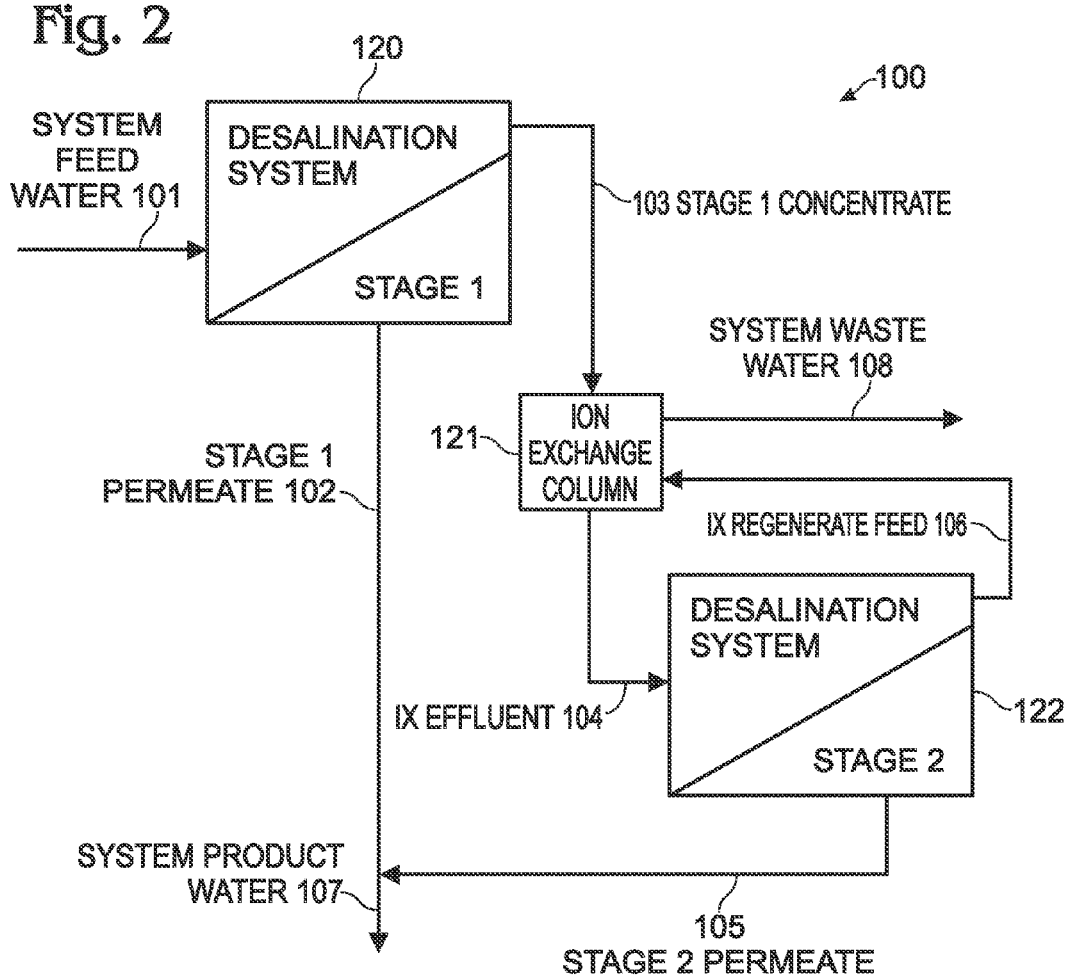
FIG. 2 is a schematic illustration of an exemplary desalination system 100 according to an embodiment of the present invention.

FIG. 2 is a schematic illustration of an exemplary desalination system 100 according to an embodiment of the present invention. As shown, the system feed water stream 101 is fed into a $1^{st}$ stage desalination system 120, resulting in two streams: a stage 1 permeate stream 102 and a stage 1 concentrate stream 103. The $1^{st}$ stage (or initial) unit process can be any desalination process, including, but not limited to, either membrane based (i.e., reverse osmosis or electrodialysis) or thermally driven technologies.

The stage 1 concentrate stage is them introduced to ion exchange columns 121, which can remove cations, anions, or both from the stage 1 concentrate. For example, under brackish water conditions, the target undesirable calcium and magnesium ions in the stage 1 concentrate are exchanged for sodium. The ions that cause scaling have then been removed from the ion exchange column effluent 104, so that water is suitable for another stage of desalination. The effluent 104 from the ion exchange columns can then be fed to a $2^{nd}$ stage desalination process 122.

Typically, the $2^{nd}$ stage desalination process will be conducted by a separate desalination system from the system that conducts the $1^{st}$ stage desalination process. However in some embodiments, the $1^{st}$ and $2^{nd}$ stages may be performed by the same system. As with the $1^{st}$ stage desalination process, the $2^{nd}$ stage desalination process can be, but is not limited to, membrane based or thermally driven, or a combination of multiple desalination stages with either technology. The product water, or stage 2 permeate, 105 can then be combined with the product water 102 from the first to increase the recovery of overall product water 107. Significantly, the stage 2 concentrate 106 can be used to regenerate the ion exchange columns 121, which then produces the ion exchange waste stream 108.

Table 2 below, shows the concentrations of various minerals in the various streams of the ion-exchange desalination process shown in FIG. 2 based on the same brackish water conditions used in Table 1.

TABLE 2

Sodium, Calcium, and Magnesium Concentrations in RO + IX Desalination Flow

| | | | Sodium | | Calcium | | Magnesium | |
|---|---|---|---|---|---|---|---|---|
| Flow | Description | Water Flow ($m^3/d$) | Conc. (meq/L) | Mass Flow (kg/d) | Conc. (meq/L) | Mass Flow (kg/d) | Conc. (meq/L) | Mass Flow (kg/d) |
| 101 | System Feed | 1000 | 9.2 | 212.0 | 16.8 | 337.0 | 7.2 | 87.7 |
| 102 | Stage 1 permeate | 750 | 0.09 | 1.59 | 0.17 | 2.53 | 0.07 | 0.66 |
| 103 | Stage 1 concentrate | 250 | 36.6 | 210.4 | 66.8 | 334.5 | 28.7 | 87.0 |

TABLE 2-continued

Sodium, Calcium, and Magnesium Concentrations in RO + IX Desalination Flow

| Flow | Description | Water Flow (m³/d) | Sodium | | Calcium | | Magnesium | |
|---|---|---|---|---|---|---|---|---|
| | | | Conc. (meq/L) | Mass Flow (kg/d) | Conc. (meq/L) | Mass Flow (kg/d) | Conc. (meq/L) | Mass Flow (kg/d) |
| 104 | IX effluent | 250 | 132.0 | 758.8 | 0.0 | 0.0 | 0.0 | 0.0 |
| 105 | Stage 2 permeate | 230 | 1.32 | 6.98 | 0.0 | 0.0 | 0.0 | 0.0 |
| 106 | IX regeneration feed | 20 | 1635.1 | 751.8 | 0.0 | 0.0 | 0.0 | 0.0 |
| 107 | System product | 980 | 0.38 | 8.57 | 0.13 | 2.53 | 0.06 | 0.66 |
| 108 | System waste | 20 | 442.4 | 203.4 | 834.5 | 334.5 | 358.2 | 87.0 |

As shown in Table 2, nearly all the salts end up in the waste stream. Moreover, when comparing Table 2 with Table 1, it can be seen that the waste stream flowrate is significantly smaller in the present embodiment. Furthermore, 98 percent product water recovery has been achieved from the overall system in Table 2, compared to the 75 percent shown in Table 1. While the concentration of sodium in the system product water in Table 2 is higher than in Table 1, the concentration of 0.38 meq/L (8.7 mg/L) is still low compared to potable water requirements. Water produced by this system is suitable for use as potable water or any other use for which desalinated water is normally used. It should be clear to those of skill in the art that while the systems shown are described as using RO, a thermally-based desalination process could be used.

Figure 3:
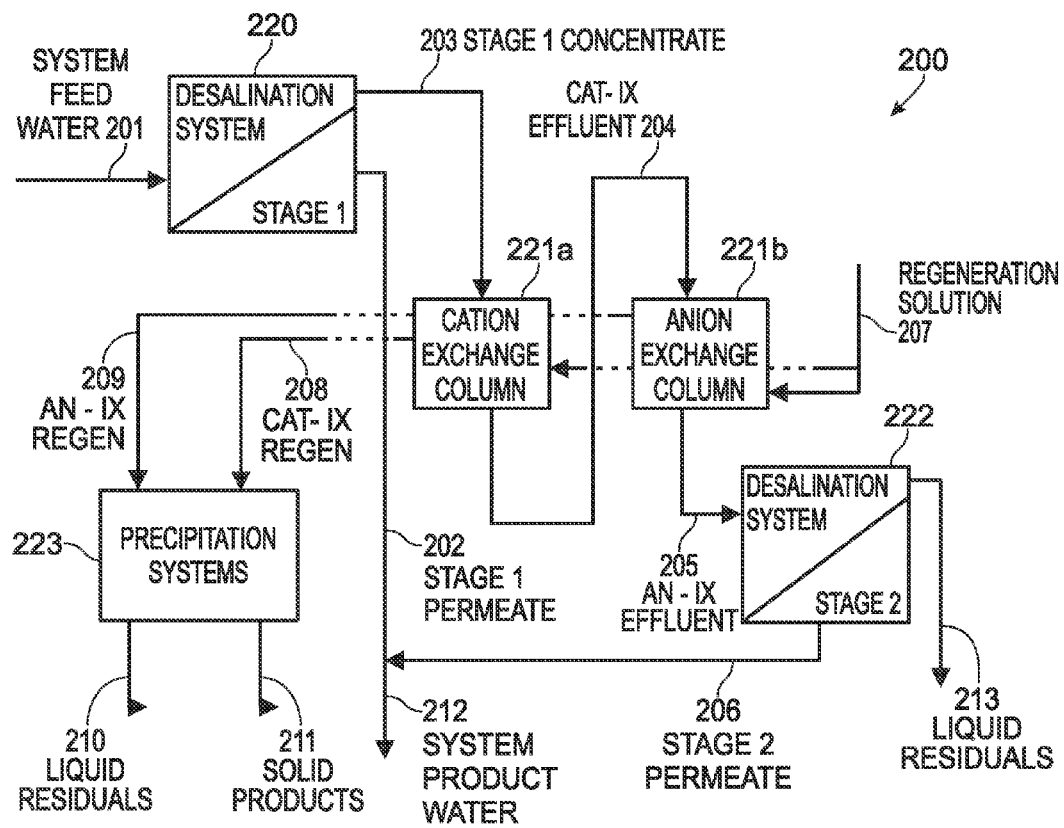
FIG. 3 is a schematic illustration of an exemplary desalination system 200 according to another embodiment of the present invention.

Turning now to FIG. 3, a schematic illustration of an exemplary desalination system 200 according to another embodiment of the present invention is shown. In this embodiment, as described in greater detail below, separate anion and cation exchange columns are used and the waste products of these columns is fed into a precipitation system.

In FIG. 3, the stage 1 concentrate 203 from the first stage of desalination system 220 passes through cation 221a and anion 221b exchange columns, in either order. The cation exchange column 221a is in the sodium form so cations such as calcium and magnesium are removed by the resin through exchange for sodium ions producing cation exchange effluent 204. The anion exchange column 221b is in the chloride form so anions such as sulfate and carbonate are removed by the resin through exchange for chloride ions. Thus, effluent 205 is primarily a sodium chloride solution. Additional desalination can be accomplished by desalination system 222 with no scale formation using either membrane-based or thermally-driven desalination technologies. The cation and anion exchange columns are then regenerated individually with, for example, a commercially available sodium chloride brine solution 207. The calcium and magnesium are concentrated in the cation exchange waste stream 208 and the sulfate and carbonate are concentrated in the anion exchange waste stream 209. In both cases, the ions are concentrated by a factor related to the ratio of volume of water treated to volume of regeneration solution used. Mixing the two waste streams in a precipitation basin 223 causes precipitation of sparingly-soluble salts removed from the original system feed water. The product water from the 1st and 2nd stages of desalination (i.e. streams 202 and 206) are mixed to produce overall system product water 212. Similar to the process shown in FIG. 2, overall system recovery would be much higher than without the ion exchange system.

Figure 4:
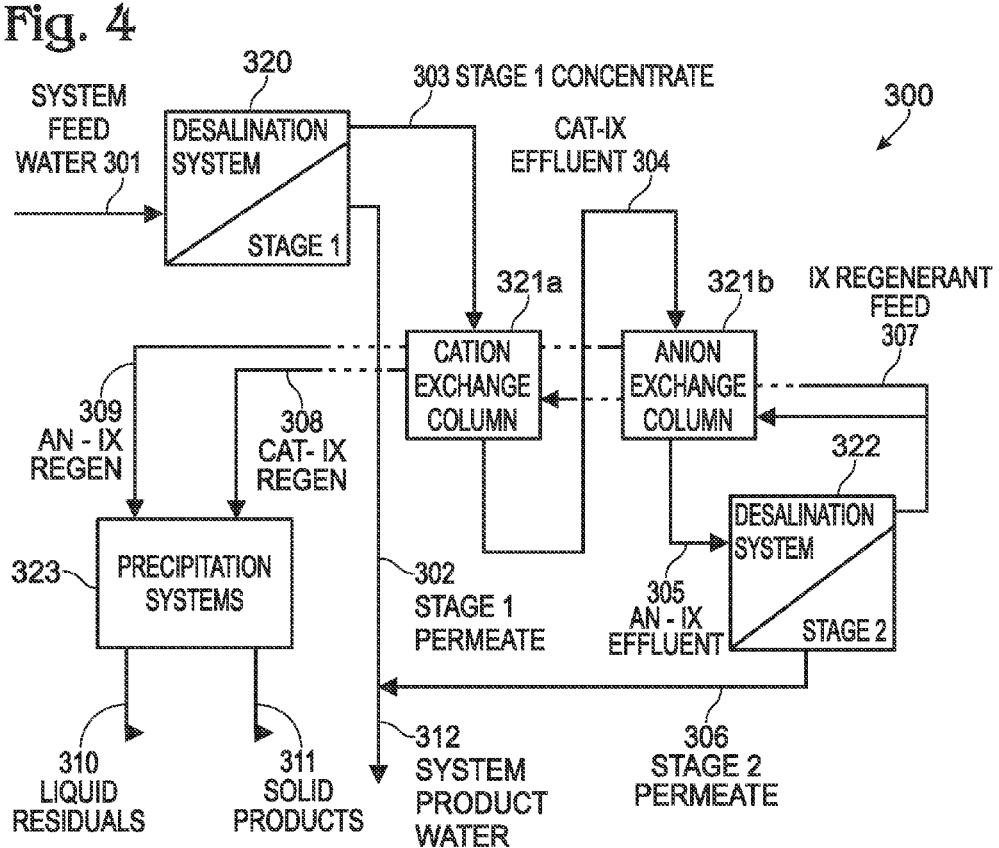
FIG. 4 is a schematic illustration of an exemplary desalination system e00 according to still another embodiment of the present invention.

Rather than using a commercially available sodium chloride brine solution to regenerate the ion exchange columns, the system may use or incorporate sodium chloride brine solutions produced by the desalination process. An exemplary embodiment is shown in FIG. 4, where the stage 2 concentrate stream 307 is used to regenerate the ion exchange columns 331a and 331b. It is further noted that the liquid residual 310 from the precipitation system 323, may be usable as a regeneration solution, but may require additional processing such as removal of precipitated solids by settling or filtration, or adjustment of pH or ion concentration.

According to a still further embodiment, the desalination processes described herein may be modified or optimized in order to allow for separation and recovery of specific desired salts. For example brackish water frequently contains significant amounts of calcium, magnesium, sulfate, and carbonate. Each cation could be separated and combined with an anion to produce a salt that could be used for commercial purposes rather than treated as a waste product. For example, calcium sulfate, commonly referred to as gypsum, is used in drywall. Even if these products do not produce a positive revenue stream, the savings, both economically and environmentally, produced by not having to dispose of them as waste material would be significant.

Figure 5:
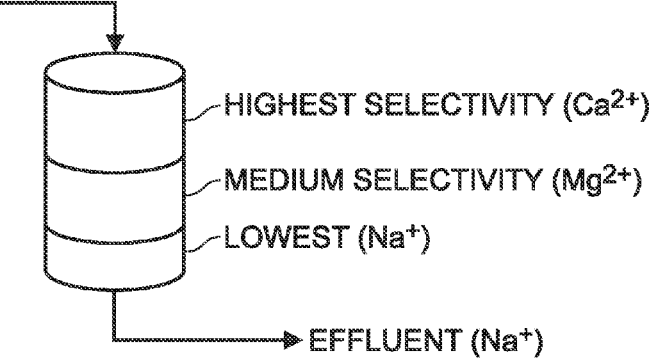
FIG. 5 is a drawing depicting separation of various ions in an ion exchange column.

Ion exchange resin selectivity can be affected by valence, atomic weight, and/or the physical properties of the resin used, for example pore size distribution or functional group type. Accordingly, resins can be described by α, the separation factor or K, the selectivity factor. As shown in FIG. 5, the selectivity of the ion exchange column could be exploited to separate the ions, making them easier to precipitate as distinct products by manipulating regeneration conditions such as, but not necessarily limited to, flow rate, flow direction, regenerant concentration, etc.

All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications. The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group.

What is claimed is:

1. A method for water recovery from a feed water stream, the method comprising:
   processing the feed water stream through a desalination system configured to produce a stage 1 permeate stream having an ion concentration lower than the feed water stream and a stage 1 concentrate stream having an ion concentration higher than the feed water stream;
   processing the stage 1 concentrate stream through at least one ion exchange column, wherein the ion exchange column is configured to exchange target ions in the stage 1 concentrate for ions of highly-soluble salts, thereby producing an ion exchange effluent having a target ion concentration lower than the stage 1 concentrate stream;
   processing the ion exchange effluent through a desalination system configured to remove ions from the ion exchange effluent, thereby producing a stage 2 permeate stream having an ion concentration lower than the ion exchange effluent and a stage 2 concentrate stream having an ion concentration higher than the ion exchange effluent;
   regenerating the ion exchange column; wherein the process of regenerating the ion exchange column produces an ion exchange waste stream;
   processing the ion exchange waste stream to separate out one or more predetermined solid products; and
   recovering the one or more predetermined solid products.

2. The method of claim 1 wherein the ion exchange column is configured to exchange non-sodium ions for sodium ions.

3. The method of claim 1 wherein the ion exchange column in configured to exchange non-chloride ions for chloride ions.

4. The method of claim 1 comprising further processing the ion exchange waste stream in a precipitation system.

5. The method of claim 1 wherein the step of processing the stage 1 concentrate stream through at least one ion exchange column comprises processing the stage 1 concentrate stream through separate cation and anion exchange columns.

6. The method of claim 5 comprising further processing the ion exchange waste streams in a precipitation system.

7. The method of claim 6 wherein the exchange or regeneration processes have been optimized so that ions can be selectively recovered for delivery to the precipitation system, wherein individual products that may have commercial value can be recovered.

8. The method of claim 1 further comprising mixing the stage 1 permeate stream with the stage 2 permeate stream to obtain system product water.

9. The method of claim 8 wherein the volume of system product water recovered is at least 90% of the volume of the feed water stream.

10. The method of claim 8 wherein the volume of system product water recovered is at least 95% of the volume of the feed water stream.

11. The method of claim 8 wherein the volume of system product water recovered is at least 98% of the volume of the feed water stream.

12. The method of claim 1 wherein the feed water stream is derived from brackish water conditions.

13. The method of claim 1 wherein the feed water stream contains a concentration of ions that is sufficient to produce scale formation in a membrane-based desalination system when operated at 90% recovery or less.

14. A method for water recovery from a feed water stream, the method comprising:
   processing the feed water stream through a desalination system configured to produce a stage 1 permeate stream having an ion concentration lower than the feed water stream and a stage 1 concentrate stream having an ion concentration higher than the feed water stream;
   processing the stage 1 concentrate stream through at least one ion exchange column, wherein the ion exchange column is configured to exchange target ions in the stage 1 concentrate for ions of highly-soluble salts, thereby producing an ion exchange effluent having a target ion concentration lower than the stage 1 concentrate stream;
   processing the ion exchange effluent through a desalination system configured to remove ions from the ion exchange effluent, thereby producing a stage 2 permeate stream having an ion concentration lower than the ion exchange effluent and a stage 2 concentrate stream having an ion concentration higher than the ion exchange effluent; and
   processing waste from the ion exchange columns to recover predetermined ions.

15. The method of claim 14 further comprising regenerating the ion exchange column with the stage 2 concentrate stream.

16. The method of claim 6 wherein mixing of the cation exchange waste stream with the anion exchange waste stream causes precipitation to form solid products that can be recovered.

17. The method of claim 16 wherein precipitation to form solid products occurs solely due to the mixing of the ion exchange waste streams without the addition of any other chemicals and without any other processing steps designed to cause precipitation.

18. The method of claim 17 wherein an acid or base is added to one or both of the ion exchange waste streams prior to the waste streams being mixed, thereby producing selective solid products when the two ion exchange waste streams are mixed.

* * * * *